United States Patent [19]

Schwander

[11] 4,304,725
[45] Dec. 8, 1981

[54] PROCESS FOR PRODUCING DISPERSE DYES

[75] Inventor: Hansrudolf Schwander, Riehen, Switzerland

[73] Assignee: Ciba-Geigy Corporation, Ardsley, N.Y.

[21] Appl. No.: 148,444

[22] Filed: May 9, 1980

Related U.S. Application Data

[63] Continuation of Ser. No. 8,218, Jan. 31, 1979, abandoned.

[30] Foreign Application Priority Data

Feb. 7, 1978 [CH] Switzerland ............... 1347/78

[51] Int. Cl.³ .............................. C07C 97/25
[52] U.S. Cl. ........................ 260/381; 260/380
[58] Field of Search ......................... 260/380, 381

[56] References Cited

U.S. PATENT DOCUMENTS 4,045,457  8/1977  Gehrke et al. ............... 260/380

FOREIGN PATENT DOCUMENTS 462430  1/1971  Japan ........................ 260/380
977608  12/1964  United Kingdom .............. 260/380

Primary Examiner—Winston A. Douglas
Assistant Examiner—Raymond K. Covington
Attorney, Agent, or Firm—John P. Spitals; Edward McC. Roberts

[57] ABSTRACT

A process for producing disperse dyes starting with anthraquinone compounds of the formula I

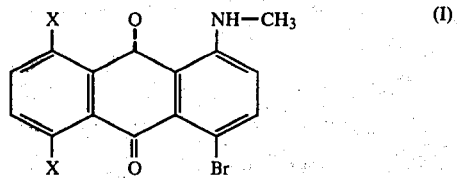

in which one X is bromine and the other X is methylamine, or with mixtures thereof, which process comprises reacting these compounds with sulfuric acid, optionally containing $SO_3$, in the presence of boric acid, at a temperature of between 100° and 150° C., to give compounds of the formula II

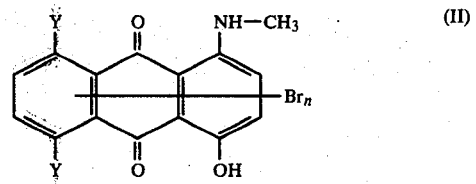

in which one Y is hydroxyl and the other Y is methylamine, and n is 0.5 to 2.0, or mixtures thereof.

7 Claims, No Drawings

PROCESS FOR PRODUCING DISPERSE DYES

This is a continuation of application Ser. No. 008,218 filed on Jan. 31, 1979, now abandoned.

The present invention relates to a novel process for producing specific disperse dyes starting with anthraquinone compounds of the formula I

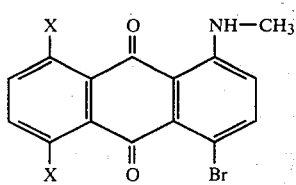

in which one X is bromine and the other X is methylamine, or from mixtures thereof, by reaction of these compounds with sulfuric acid, optionally containing $SO_3$, in the presence of boric acid, at a temperature of between 100° and 150° C., to give compounds of the formula II

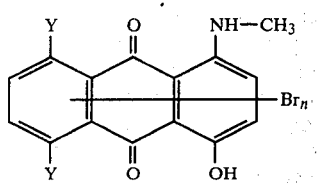

in which one Y is hydroxyl and the other Y is methylamine, and n is 0.5 to 2.0, or mixtures thereof.

The dyes of the formula II are known and are produced as a rule starting with other anthraquinone compounds, for example according to German Offenlegungsschrift No. 1,953,756 with the corresponding acylamino compounds.

Particularly interesting disperse dyes are obtained by starting with 1,5-dimethylamino-4,8-dibromoanthraquinone, or with 1,8-dimethylamino-4,5-dibromoanthraquinone, or with a mixture of 1,5-dimethylamino-4,8-dibromoanthraquinone and 1,8-dimethylamino-4,5-dibromoanthraquinone.

There is obviously a synergistic interaction between the various compounds of the formula II in the mixtures with regard to dyeing behaviour, and the mixtures yield very deeply coloured blue dyeings.

The starting compounds of the formula I are obtained for example by nitration of anthraquinone, and subsequent aminolysis as well as bromination, for example according to Swiss patent Specification No. 594.023. 1,5-Dinitro or 1,8-dinitroanthraquinone or mixtures thereof are advantageously used. Instead of the stated nitro compounds, a mixture of nitration residues from the production of definite dinitroanthraquinones can also be advantageously used. There may be mentioned for example a mixture of the following composition:

| | |
|---|---|
| 1-nitroanthraquinone | 0.6% |
| 1,5-dinitroanthraquinone | 14.7% |
| 1,6-dinitroanthraquinone | 3.5% |
| 1,7-dinitroanthraquinone | 14.4% |
| 1,8-dinitroanthraquinone | 65.0% |
| other ingredients | 1.8% |

To 1 part of dibromodimethylaminoanthraquinone of the formula I there are advantageously used at least 4 parts of sulfuric acid and at least 0.1 part of boric acid. Particularly good results are obtained by using sulfuric acid which contains up to 40% of $SO_3$, advantageously 5 to 20% of $SO_3$. The reaction temperature is advantageously between 100° and 150° C., preferably between 125° and 145° C.

In further processing, the reaction mixture can be poured into ice water, whereupon the dye or the dye mixture precipitates and can be filtered off and dried.

The resulting dyes are mixtures which on average contain about 0.5 to 2.0 bromine atoms in the molecule. They are free from sulfonic acid groups and have excellent substantivity and also excellent build-up properties on hydrophobic fibres, for example those made from cellulose acetate, from polyamides and especially from polyesters. The dyes exhibit also a good wool resist.

Since on hydrolysis of 1-bromo-4-acylaminoanthraquinone with sulfuric acid there is obtained a bromine-free 1-hydroxy-4-aminoanthraquinone (see French patent Specification No. 1,574,809), it is surprising that on hydrolysis of dibromo-diaminoanthraquinones there are obtained bromine-containing dihydroxydiaminoanthraquinones which hitherto were only obtainable either by bromination of expensive dihydroxydiaminoanthraquinones or by hydrolysis of tri- or tetrabromodiaminoanthraquinones, with the dyes obtained by the last-mentioned process having an inadequate wool resist.

According to German Offenlegungsschrift No. 19 53 756 however, where dibromodiacylaminoanthraquinones are hydrolysed, one further reaction step is required to produce the dibromodiacylaminoanthraquinones. The novel process is all the more valuable because low-grade nitration residues, which would normally pose an ecological problem, can be used as starting compounds of the formula I.

The process according to the invention is hence a two-stage process comprising converting in the first stage a dinitro-anthraquinone compound, or a mixture of dinitroanthraquinone compounds, into a dibromodimethylaminoanthraquinone compound of the formula I, and reacting this in the second stage, by bromine exchange, to give a hydroxybromoaminoanthraquinone compound of the formula II.

Except where otherwise stated in the Examples which follow, the term 'parts' denotes parts by weight, the percentages are percent by weight, and the temperature values are given in degrees Centigrade.

EXAMPLE 1

(a) In a flask with stirrer, which is provided with a gas-inlet tube, a mixture consisting of 360 ml of o-dichlorobenzene and 37.25 g of 1,5-dinitroanthraquinone is heated to a temperature of 120°, whereupon 62 g of methylamine gas is slowly introduced in the temperature range of 120° to 125°, in the course of which the initially pale-yellow suspension assumes an intense blue-red colour. The flask with stirrer is then provided with a descending condenser, and under a slight vacuum the excess of methylamine gase is expelled, and 30 ml of dichlorobenzene is distilled off. The reaction mixture is allowed to cool, and at 40° are added 25 g of anhydrous sodium acetate and 0.10 g of iodine. There is then very slowly added dropwise below the surface, with good stirring and at an internal temperature of 20° to 25°, a mixture consisting of 12.50 ml of bromine and 15 ml of dichlorobenzene. After this addition, the mixture is stirred for a further 5 hours at the same temperature. An addition of 15 ml of a 25% sodium bisulfite solution is subsequently made, and the contents of the flask are subjected to steam distillation. The residue from the steam distillation process is dried to thus obtain 1,5-dimethylamino-4,8-dibromoanthraquinone in the form of dark blue granules.

(b) 8.50 g of 1,5-dimethylamino-4,8-dibromoanthraquinone is introduced into a mixture consisting of 125 g of oleum, containing 10% of free sulfur trioxide, and 4.90 g of boric acid. The temperature is uniformly increased within 3 hours to 135°, and is subsequently maintained for 5 hours at 135° to 140°. A blue-violet solution is obtained, with brown bromine vapours becoming visible in the free space of the flask. The contents of the flask are poured into a mixture of 250 g of ice, 100 ml of water and 20 ml of sodium bisulfite solution (25%); the dye which has precipitated is filtered off, and is thoroughly washed first with water, then with diluted ammonia solution, and finally again with water. After drying in vacuo at 70°, the dye is obtained as a dark-blue powder.

When a dye preparation containing 2 g of the dye obtained is applied by the high-temperature dyeing process to polyester, a blue dyeing having good fastness properties is obtained. The dye obtained builds up well on polyester, and exhibits a good covering of streakiness due to the material.

A dye having similar properties is obtained by using, in place of 1,5-dimethylamino-4,8-dibromoanthraquinone, the same amount of 1,8-dimethylamino-4,5-dibromoanthraquinone, the procedure otherwise remaining the same.

EXAMPLE 2

A mixture consisting of 11.10 g of 1,5-dimethylamino-4,8-dibromoanthraquinone and 22.20 g of 1,8-dimethylamino-4,5-dibromoanthraquinone is reacted in corresponding amounts as described in Example 1b. There is obtained a dye mixture which, applied as a disperse dye by one of the customary dyeing processes to polyester fibres, dyes these polyester fibres in a blue shade. The dye exhibits very good build-up properties.

A dye mixture having similar properties is obtained by using a mixture of 8.30 g of 1,5-dimethylamino-4,8-dibromoanthraquinone and 21.40 g of 1,8-dimethylamino-4,5-dibromoanthraquinone, with otherwise the same procedure.

EXAMPLE 3

In a flask provided with stirrer, 208 g of anthraquinone is dissolved in 1350 g of sulfuric acid monohydrate, whereupon a mixture consisting of 208 g of sulfuric acid monohydrate and 208 g of nitric acid is added at a temperature of 30° to 35°. The temperature is then slowly raised to 90°, and the reaction mixture is subsequently stirred at 90° to 95° for 3 hours. It is then poured into 3 kg of ice, the formed precipitate is filtered off, washed with water until neutral and the product is subsequently dried.

37.20 g of the mixture of nitroanthraquinones thus obtained is reacted as described in Examples 1a and 1b. There is obtained a blue disperse dye which builds up very well on polyester, and which dyes polyester fibres in deeply coloured navy blue shades having good fastness to light.

EXAMPLE 4 b 37.20 g of a nitroanthraquinone mixture of the following composition:

| | |
|---|---|
| 1-nitroanthraquinone | 0.6% |
| 1,5-dinitroanthraquinone | 14.7% |
| 1,6-dinitroanthraquinone | 3.5% |
| 1,7-dinitroanthraquinone | 14.4% |
| 1,8-dinitroanthraquinone | 65.0% |
| other constituents | 1.8% | is treated as described in the Examples 1a and 1b. There is obtained a blue disperse dye which builds up very well on polyester, and which dyes polyester fibres in deeply-coloured navy blue shades having good fastness properties.

Surprisingly, the secondary dyes do not unfavourable affect the dyeing behaviour and the fastness properties of the dyeings on polyester.

DYEING EXAMPLES

EXAMPLE 5

2 g of the dye obtained according to Example 1b is dispersed in 4000 g of water. To this dispersion is added, as swelling agent, 12 g of the sodium salt of o-phenylphenol, as well as 12 g of diammonium phosphate; and 100 g of yarn made from polyethylene glycol terephthalate is dyed for 1½ hours at 95° to 98°. The dyeing is rinsed, and subsequently treated with aqueous sodium hydroxide solution and a dispersing agent. A blue dyeing having good overall fastness properties is obtained.

A blue dyeing having good fastness properties is obtained by replacing in the above Example the 100 g of polyethylene glycol terephthalate yarn by 100 g of cellulose triacetate fabric, dyeing under the same conditions and subsequently rinsing with water.

EXAMPLE 6

In a pressure dyeing apparatus, 2 g of the dye obtained according to Example 1b is finely dispersed in 2000 g of water containing 4 g of oleyl polyglycol ether. The pH value of the dye bath is adjusted to 4 to 5 with acetic acid. 100 g of polyethylene glycol terephthalate fabric is then introduced at 50°, the bath is heated to 140° within 30 minutes, and dyeing is performed for 50 minutes at this temperature. The dyeing is subsequently rinsed with water, soaped and dried.

There is obtained when these conditions are observed a blue dyeing having good fastness to washing, perspiration and light.

The dyes described in the other Examples yield in this process dyeings which are equal in quality.

A blue dyeing is obtained by replacing in the above Example the 100 g of polyethylene glycol terephthalate by 100 g of cellulose triacetate fabric, dyeing under the described conditions, and subsequently rinsing with water.

EXAMPLE 7

Polyethylene glycol terephthalate fabric is impregnated on a padding machine at 40° with a liquor of the following composition: 20 g of the dye obtained according to Example 1b finely dispersed in 7.5 g of sodium alginate, 20 g of triethanolamine, 20 g of octylphenol polyglycol ether and 900 g of water.

The fabric, squeezed out to about 100%, is dried at 100°, and subsequently fixed for 30 seconds at a temperature of 210°. The dyed material is rinsed with water, soaped and dried. A blue dyeing having good overall fastness properties is obtained under these conditions. The dyes described in the other Examples yield in this process dyeings which are equal in quality.

What is claimed is:

1. A process for producing a disperse dye or their mixtures thereof of the formula (I)

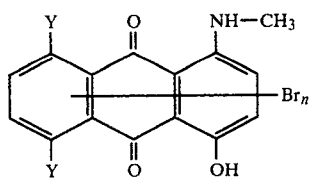

wherein one Y is hydroxyl and the other Y is methylamine, n is 0.5 to 2.0, which comprises the steps of:
subjecting 1,5-dinitro-anthraquinone or 1,8-dinitroanthraquinone or their mixtures thereof or mixtures of nitration residues of 1-nitro-anthraquinone, 1,5-dinitro-anthraquinone, 1,6-dinitro-anthraquinone, 1,7-dinitro-anthraquinone and 1,8-dinitro-anthraquinone to aminolysis with methylamine to give 1,5-dimethylaminoanthraquinone or 1,8-dimethylaminoanthraquinone or their mixtures or corresponding mixtures of dimethylamino residues;
brominating said 1,5-dimethylamino anthraquinone or
1,8-dimethylamino anthraquinone or their mixtures or mixtures of dimethylamino residue, to give the corresponding bromo compound of the formula III or their mixtures thereof

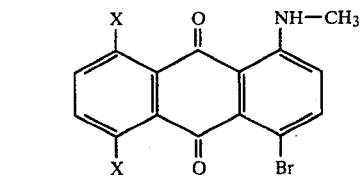

wherein one X is bromine and the other X is methylamine; and hydrolysing said bromo compound or their mixtures thereof with sulfuric acid, optionally containing SO$_3$, in the presence of boric acid, at a temperature between 100° and 150° C., to give said disperse dye or their mixtures thereof.

2. A process according to claim 1, wherein 4 parts of H$_2$SO$_4$ and at least 0.1 part of boric acid are used to 1 part of the compound of the formula III.

3. A process according to claim 1, wherein said sulfuric acid contains up to 40% of SO$_3$.

4. A process according to claim 1, wherein 1,5-dinitroanthraquinone is used as starting material.

5. A process according to claim 1, wherein 1,8-dinitroanthraquinone is used as starting material.

6. A process according to claim 1, wherein a mixture of 1,5-dinitro-anthraquinone and 1,8-dinitro-anthraquinone is used as starting material.

7. A process according to claim 1, wherein a mixture of nitration residues is used as starting material.

* * * * *